United States Patent
Yo et al.

(10) Patent No.: US 6,301,778 B1
(45) Date of Patent: Oct. 16, 2001

(54) FIXTURE FOR DISMOUNTING CPU OF A PORTABLE-TYPE COMPUTER SYSTEM

(75) Inventors: Yu-Shi Yo; Tsung-Hsing Fang; Teh-Chuan Ou, all of Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 09/520,558

(22) Filed: Mar. 8, 2000

(30) Foreign Application Priority Data

May 10, 1999 (TW) .................................................. 88207379

(51) Int. Cl.$^7$ .................................................. H01R 43/00
(52) U.S. Cl. .................. 29/764; 29/758; 29/741; 294/100; 294/1.1
(58) Field of Search .............................. 29/764, 763, 762, 29/758, 270, 278, 741; 81/419, 415, 342; 294/1.1, 100

(56) References Cited

U.S. PATENT DOCUMENTS

| | | | |
|---|---|---|---|
| 2,853,772 | * | 9/1958 | Yuter ....................................... 29/278 |
| 3,443,297 | * | 5/1969 | Lusby, Jr. ............................... 29/203 |
| 3,909,899 | * | 10/1975 | Witt ..................................... 29/203 H |
| 4,389,770 | * | 6/1983 | Bocinski et al. ........................ 29/764 |
| 4,521,959 | * | 6/1985 | Sprenkle ............................... 29/741 |
| 4,970,779 | * | 11/1990 | Chen ..................................... 29/764 |
| 5,875,544 | * | 3/1999 | Chou ..................................... 29/741 |

FOREIGN PATENT DOCUMENTS

| | | |
|---|---|---|
| 84204504 | 4/1995 | (TW) . |
| 84204506 | 4/1995 | (TW) . |

* cited by examiner

*Primary Examiner*—Lee Young
*Assistant Examiner*—Minh Trinh
(74) *Attorney, Agent, or Firm*—Rabin & Berdo, P.C.

(57) ABSTRACT

The fixture for dismounting a CPU from a portable-type computer system having a motherboard with a CPU-mounting location is provided. The fixture includes a first device capable of displacing, a second device and a third device. The second device receives the first device and limits the displacement of the first device. The third device is responsive to an external force and forces the first device to make displacement such that CPU is dismounted from the motherboard.

7 Claims, 6 Drawing Sheets

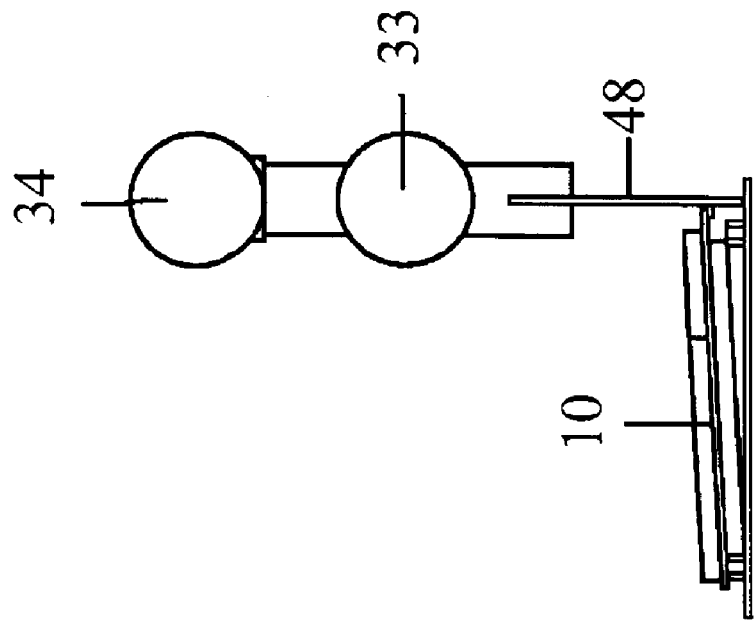
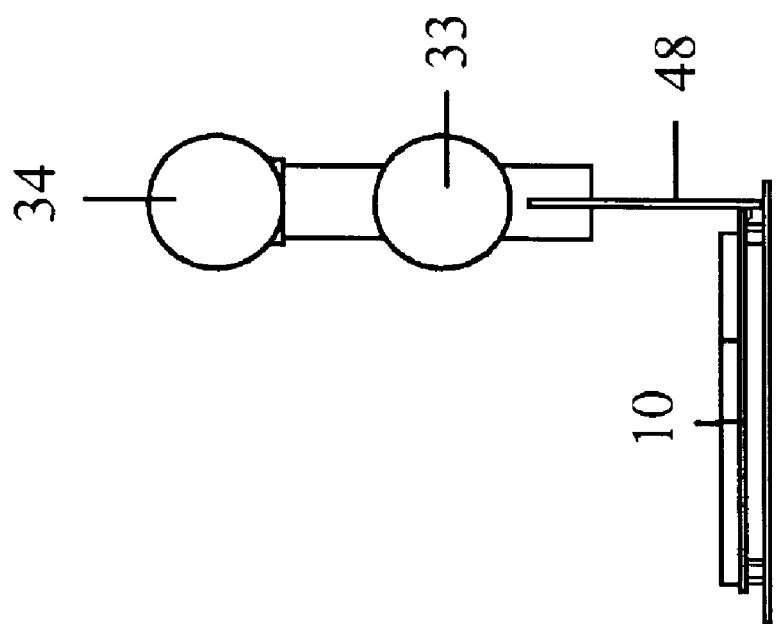
Fig. 8 (b)
Fig. 8 (a)

FIXTURE FOR DISMOUNTING CPU OF A PORTABLE-TYPE COMPUTER SYSTEM

FIELD OF INVENTION

The present invention relates to a fixture for dismounting a CPU of a portable-type computer system.

BACKGROUND OF INVENTION

To save space in a portable-type computer system, in general, the CPU mounted to the motherboard is adjacent to nearby components of the motherboard. Taking the Intel's CPU for portable-type computer as an example, the back surface of the CPU provides hundreds of metal pins and a protection frame. Hundreds of metal pins provide paths for signals between the CPU and the motherboard. In addition, as shown in FIG. 1, the edge of the CPU 10 provides a first depression 131 and a second depression 132. The depressions 131, 132 provide spaces 14 for insertion of a tool which is used to dismount the CPU 10 from the mounting location of the motherboard. In general, the space 14 is in the dimension of 8 mm×4 mm.

In the past, a prior art clamp device 20 shown in FIG. 2 has two hook ends 21, 22. The hook ends 21, 22 can be respectively disposed into the spaces 14 formed by the depressions 131 and under the surface of CPU 10. The operator then can exert force upwardly to lift up and dismount the CPU 10. However, since it is not easy to control the direction of applied force when using the deformable clamp device 20, the metal pins on the CPU may be damaged. It has been observed that, when the lift-up angle of the CPU 10 with respect to the motherboard exceeds 10 degrees during dismounting operation, the metal pins will experience significant deformation.

The prior art technology disclosed, on Sep. 1, 1995, in Taiwan publication no. 256415 and 256416 show a dismounting fixture having four grasp fingers. However, the dismounting fixture disclosed only applies to CPUs of 80486 type and not to CPUs of Pentium type or above. In addition, one can not accurately control the external force applied using this prior art technology.

SUMMARY OF INVENTION

The main objective of the invention is to provide a fixture which dismounts the CPU of a portable-type computer without damaging either the CPU or other adjacent components on the motherboard.

The fixture for dismounting a CPU from a portable-type computer system having a motherboard with a CPU-mounting location is provided. The fixture includes a first device capable of displacing, a second device and a third device. The second device receives the first device and limits the displacement of the first device. The third device is responsive to an external force and forces the first device to make displacement such that CPU is dismounted from the motherboard,

BRIEF DESCRIPTION OF DRAWINGS

FIG. 8(a) shows the status of the fixture and CPU with respect to the motherboard when the fixture is in place before the dismounting operation is performed.

FIG. 8(b) shows the status of the fixture and CPU with respect to the motherboard after the dismounting operation is performed.

DETAILED DESCRIPTIONS OF THE EMBODIMENTS

Figure 1:
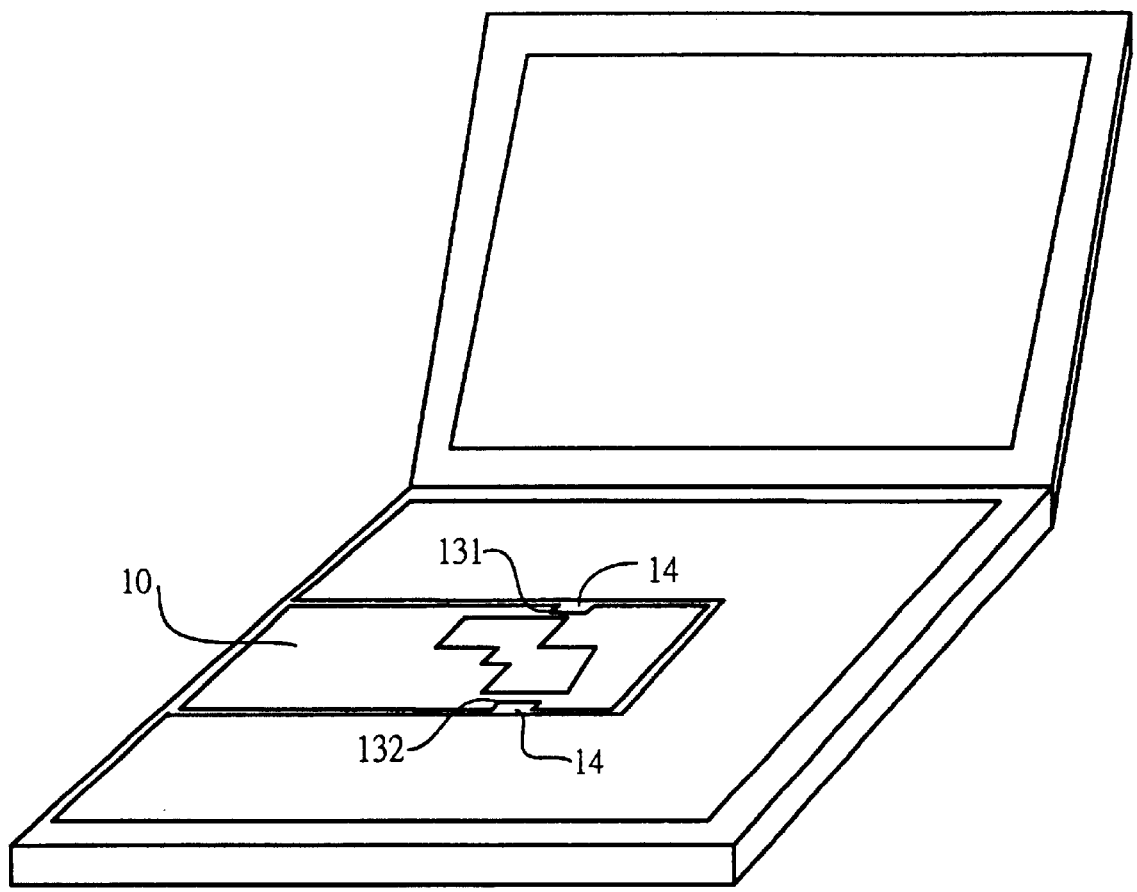
FIG. 1 shows a portable-type computer having a motherboard with a CPU chip mounted thereon.
Figure 2:
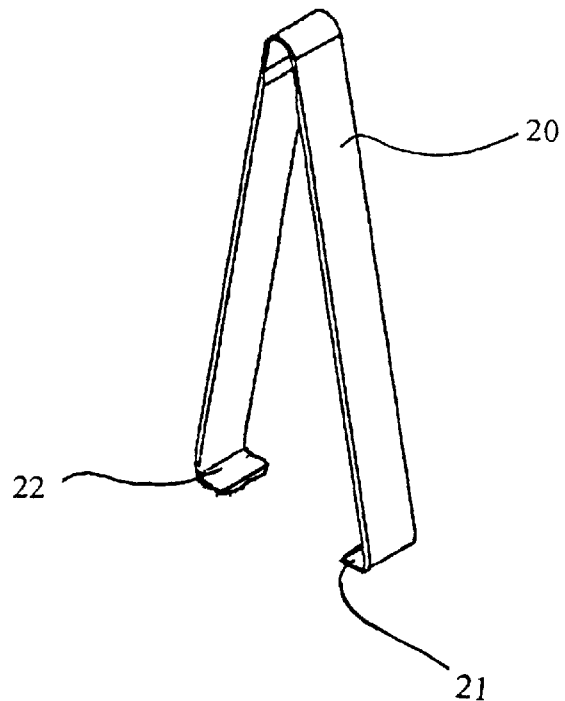
FIG. 2 shows a prior art CPU dismounting fixture.
Figure 3:
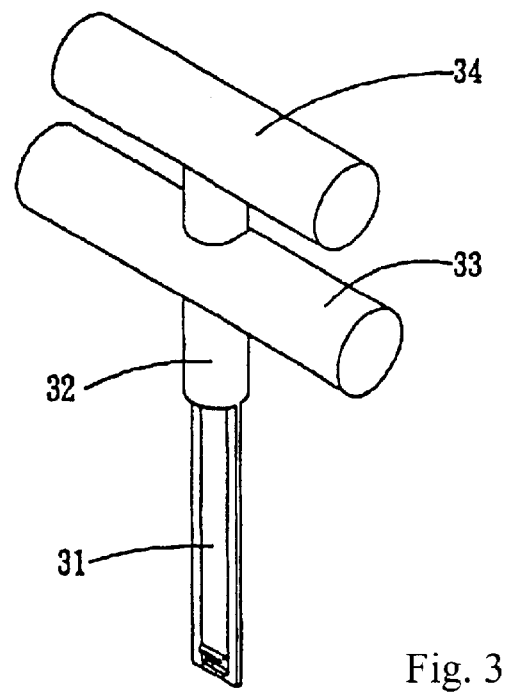
FIG. 3 shows a dismounting fixture in assembly form according to the invention.

As shown in FIG. 3, the fixture of the invention includes a first device 31, a second device 32 housing the first device 31, and a third device 33. The first device 31 is capable of displacing along a channel provided by the second device 32 to receive the first device 31 which will be more clear hereinafter. In addition to providing a channel to receive the first device 31, the second device 32 also provides a mechanism to limit the displacement of the first device 31. The third device 33 is responsive to an external force for forcing the first device 31 to make upward displacement such that the CPU is dismounted from the motherboard. In addition, the fixture includes a fourth device 34, which is attached to a top of the second device 32, for supporting a palm of an operator while applying the external force to the third device 33.

Figure 4:
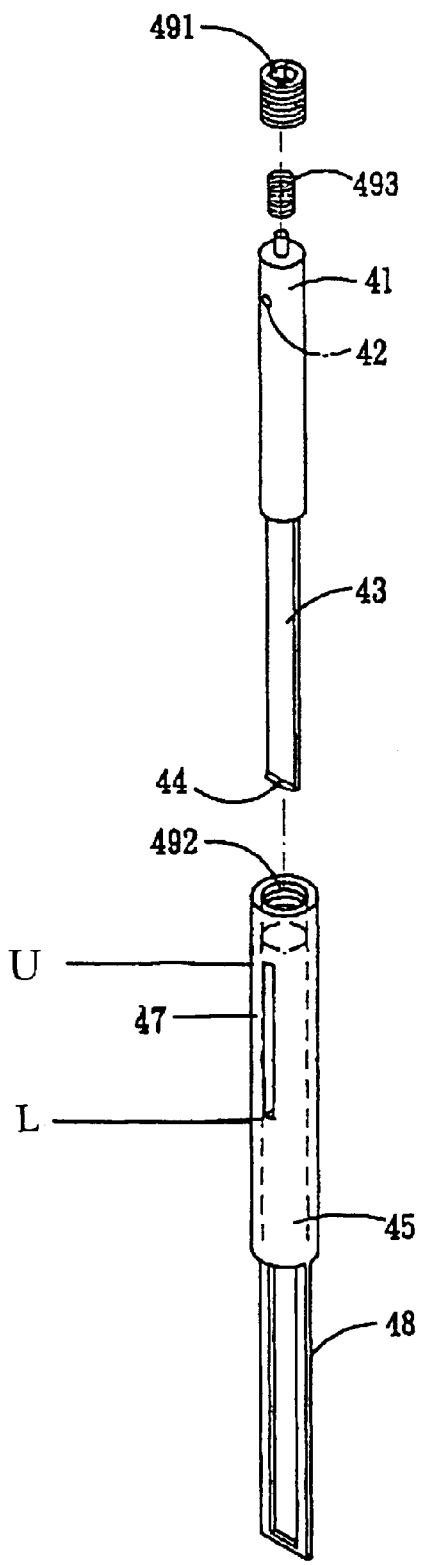
FIG. 4 shows the first device and the second device of dismounting fixture of invention in explosive view.
Figure 5:
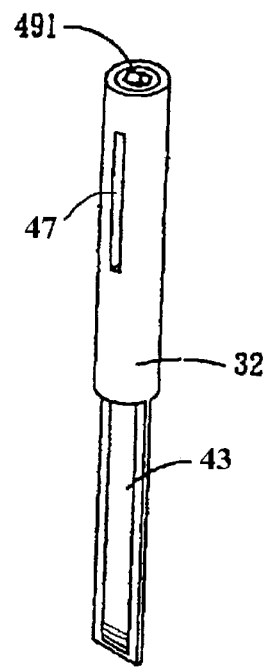
FIG. 5 shows the first device and second device of dismounting fixture of invention in an assembly form.

As shown in FIG. 4, the first device 31 includes a cylindrically-shaped member 41, a plate-like member 43, extending from the member 41, with a hook-type end 44. The hook-type end 44 functions to press against the CPU during the dismounting operation and lifts up the CPU 10 responsive to the external force. The member 41 includes a through-hole 42 in a radial direction of the member 41 for insertion of a pin 51 shown in FIG. 6.

To facilitate the insertion of the hook-type end 44 into the corresponding space 14, in a preferred embodiment, the plate-like member 43 has a thickness of 1 mm ad the thickness of the hook-type end 44 is about 2 mm.

The second device 32 includes a pipe 45 (tubular-shaped hollow body) which defines a channel for receiving the first device 31. The pipe 45 defines two axial-symmetrically disposed longitudinal slots 47 for insertion of a pin 51 which passes through the two longitudinal slots 47 and the through-hole 42 when the fixture is in assembled form. The pin 51 is also used to attach the third device 33 into the first device 31, and as the external force is applied to the third device 33, the first device 31 is driven to make displacement. In addition, the longitudinal slot 47 defines an upper edge and a lower edge. Therefore, the longitudinal slot 47 cooperates with the pin 551 to limit the displacement of the first device 31. The second device 32 further includes a U-shaped frame 48 extending from a bottom of the pipe 45 for pressing against the motherboard during the dismount operation of CPU.

In order to accurately control the stroke of the first device 31 in the pipe 45, a male screw 491, and a corresponding female screw (threaded socket) 492 at the top end of the pipe 45 are provided. When the male screw 491 is screwed into the female screw 492, their relative screw relationship decides the actual allowable stroke of the first device 31. In a preferred embodiment, the adjustable stroke range is about 0~6 mm.

In addition, an elastic device 493 is provided and disposed between the male screw 491 and a top surface of the member 41. As the member 41 moves upward to press against the elastic device 493 during dismounting operation, the elastic device 493 is deformed and energy is stored therein. As the external force is released, the elastic device 493 makes the member 41 resume its initial condition.

Figure 6:
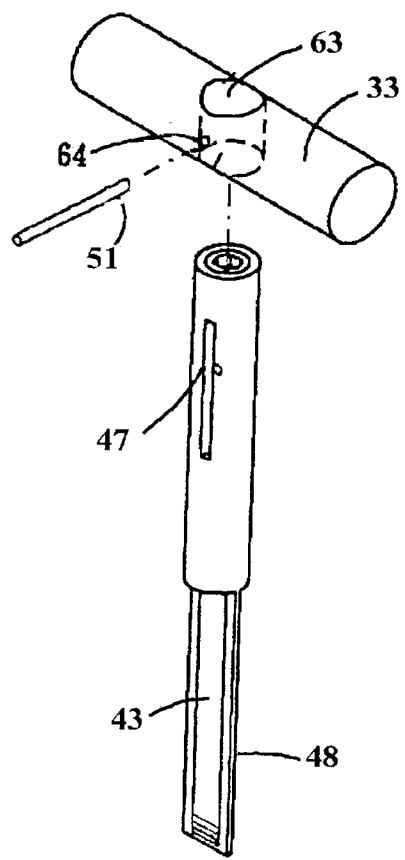
FIG. 6 shows the status of the third device with respect to the assembly form of the first and second devices before the third device is attached to the first device by a pin 51.
Figure 7:
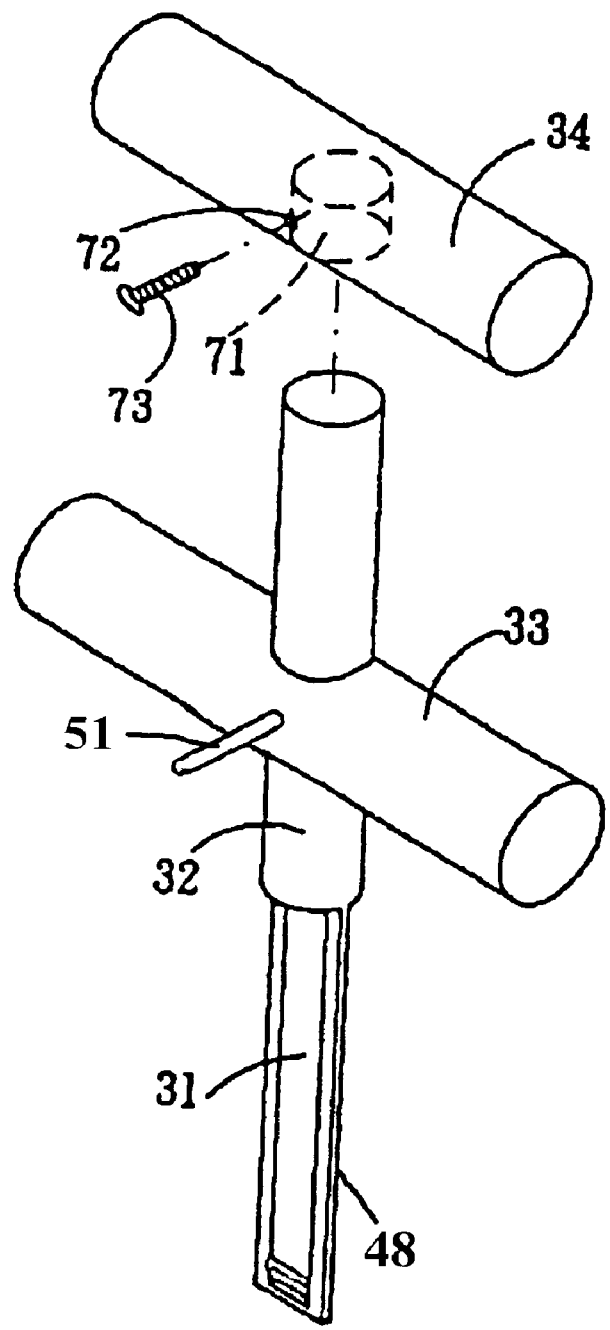
FIG. 7 shows how the fourth device is attached to the second device.

As shown in FIG. 6, the third device 33 includes a channel 63 and through-hole 64. The top portion of second device 32, with the first device 31 inserted therein, is inserted in the channel 63 such that the through-hole 42 is accessible through the through-hole 64 and the longitudinal slot 47. As shown in FIGS. 4 and 6, during, assembly, the pin 51 passes through the through-hole 64 on the third device 33, the longitudinal slot 47, and then pin 51 is inserted into the through-hole 42. As the external force is applied to the third device 33, the force is transmitted to the first device 31 by the pin 51.

To facilitate the easy grip of the fixture by an operator, the fixture may further include a fourth device 34. The fourth device 34 includes a, channel 71 and a female screw 72. The top portion of the second device 32 is inserted into the channel 71 first. A male screw 73 is provided for insertion into the female screw 72 and to connect the fourth device 34 to the second device 32.

As shown in FIG. 8(a), before dismounting operation is actually performed, the hook-type end 44 is first inserted into the space 14 provided by the depression 131 such that the hook-type end 44 touches against the bottom of the CPU 10. Secondly, the operator makes an adjustment of the location of the screw 491 to constrain the displacement of the first device 31. Afterwards, the operator applies a force to the third device 33. And, due to the action of the pin 51, the first device 31 makes displacement such that the CPU 10 is lifted up as shown in FIG. 8(b). After the status shown in FIG. 8(b), the fixture is used again by inserting the hook-type end 44 into the space 14 provided by the second depression 132 such that the hook-type end 44 touches against the bottom of the CPU 10. The same procedure recited above is performed until the CPU 10 is entirely detached from the mounting area on the motherboard.

What is claimed is:

1. A fixture for dismounting a first component from a second component, comprising:
    a first device having a hook on one end, said first device having a through-hole extending in a radial direction thereof;
    a pin insertable into the through hole;
    a second device having a hollow body and a frame section, said frame section having a proximal end attached to the hollow body, and a distal end, said first device being displaceably disposed within said hollow body, said second device further having means for limiting a displacement of said first device; and
    a third device slidably disposed around said hollow body of said second device, and being fastened to said first device, wherein when said third device is slid relative to said hollow body and in a longitudinal direction, said first device is moved in the longitudinal direction, thereby moving said hook in a direction away from the distal end of said frame section;
    wherein said hollow body of said second device includes two opposing longitudinal slots, said pin projecting out of opposing sides of said first device, through the two longitudinal slots, and into said third device to fasten said third device to said first device.

2. The fixture of claim 1, further comprising a fourth device attached to a top of the hollow body of said second device and being fixed relative thereto, said fourth device supporting a palm of an operator when a force is applied to the third device so as to slide the third device in the longitudinal direction.

3. The fixture of claim 1, wherein said means for limiting a displacement comprises said two longitudinal slots which limit an amount of longitudinal displacement of said pin, said first device and said third device.

4. The fixture of claim 1, wherein said frame section is essentially U-shaped, with a base of the U-shaped frame section defining the distal end thereof, and with legs of the U-shaped frame section being attached to said hollow body; and
    wherein said first device includes a cylindrically-shaped section disposed within said hollow body, and a plate member attached to said cylindrically-shaped section and being disposed between the legs of the U-shaped frame section, said hook being disposed over the base of said U-shaped frame section.

5. The fixture of claim 3, wherein said means for limiting a displacement further comprises a threaded socket provided on a top end of said hollow body, and a male screw threadably engagable with the threaded socket, the threaded socket cooperating with the male screw to set an allowable amount of displacement of said first device.

6. The fixture of claim 5, wherein said second device further comprises an elastic device disposed between the male screw and a top surface of said first device, the elastic device urging said hook of said first device in a direction toward the distal end of said frame section.

7. The fixture of claim 4, wherein said hollow body is tubular-shaped.

* * * * *